United States Patent
Johnson

(10) Patent No.: US 11,460,388 B2
(45) Date of Patent: Oct. 4, 2022

(54) ADAPTIVE GAIN ADJUSTMENT FOR A FATIGUE TEST APPARATUS

(71) Applicant: THE BOEING COMPANY, Chicago, IL (US)

(72) Inventor: Keith E. Johnson, Snohomish, WA (US)

(73) Assignee: THE BOEING COMPANY, Chicago, IL (US)

( * ) Notice: Subject to any disclaimer, the term of this patent is extended or adjusted under 35 U.S.C. 154(b) by 525 days.

(21) Appl. No.: 16/521,106

(22) Filed: Jul. 24, 2019

(65) Prior Publication Data

US 2021/0025797 A1 Jan. 28, 2021

(51) Int. Cl.
*G01N 3/36* (2006.01)
*G01N 3/06* (2006.01)
*G01N 3/32* (2006.01)

(52) U.S. Cl.
CPC ........... *G01N 3/36* (2013.01); *G01N 3/06* (2013.01); *G01N 2203/0048* (2013.01); *G01N 2203/0073* (2013.01)

(58) Field of Classification Search
CPC ...... G05B 13/0215; G05B 2219/13103; G05B 2219/42134; G05B 2219/42137; G05B 2219/42139; G05B 2219/42145; G05B 2219/42147; G05B 2219/42152; G05B 13/048; G05B 5/01; G01N 3/02; G01M 17/00; G01M 17/0074; G01M 7/022; G01M 1/36; H04R 3/007; G11B 5/59622; G05D 7/06; G01F 1/696

See application file for complete search history.

(56) References Cited

U.S. PATENT DOCUMENTS

| | | | |
|---|---|---|---|
| 3,699,989 | A | 10/1972 | O'Connor et al. |
| 2007/0051184 | A1 | 3/2007 | Englund et al. |
| 2008/0221710 | A1 | 9/2008 | Brunell |
| 2010/0152868 | A1 | 6/2010 | Chen et al. |
| 2012/0109464 | A1 | 5/2012 | Mizutani et al. |

(Continued)

OTHER PUBLICATIONS

Fatigue Testing, Wikipedia, https://en.wikipedia.org/wiki/Fatigue_testing, printed on Jul. 10, 2019, 5 pages.

(Continued)

*Primary Examiner* — Brandi N Hopkins
(74) *Attorney, Agent, or Firm* — Moore Intellectual Property Law, PLLC

(57) ABSTRACT

A fatigue test apparatus includes a control system configured to receive, during a first iteration of a fatigue test of an article under test, a command signal corresponding to a particular test step of the fatigue test. The control system is configured to generate, based on the command signal and during the first iteration, a test output signal to cause a force to be applied to the article under test. The control system is configured to generate an error signal associated with the particular test step during the first iteration. A gain calculation device is configured to generate, based on the error signal, a gain adjustment value associated with the particular test step. A variable gain feedforward device is configured to provide, during a second iteration of the fatigue test and based on the gain adjustment value, a stabilization gain to the control system.

20 Claims, 9 Drawing Sheets

(56) References Cited

U.S. PATENT DOCUMENTS

2014/0081426 A1* 3/2014 Johnson ............ G05B 13/0215
 700/47
2015/0283581 A1 10/2015 Jones et al.
2018/0157221 A1* 6/2018 Anderson ............ G05B 13/024

OTHER PUBLICATIONS

Mechanical Testing, Wikipedia, https://en.wikipedia.org/wiki/Mechanical_testing, printed on Jul. 10, 2019, 2 pages.

* cited by examiner

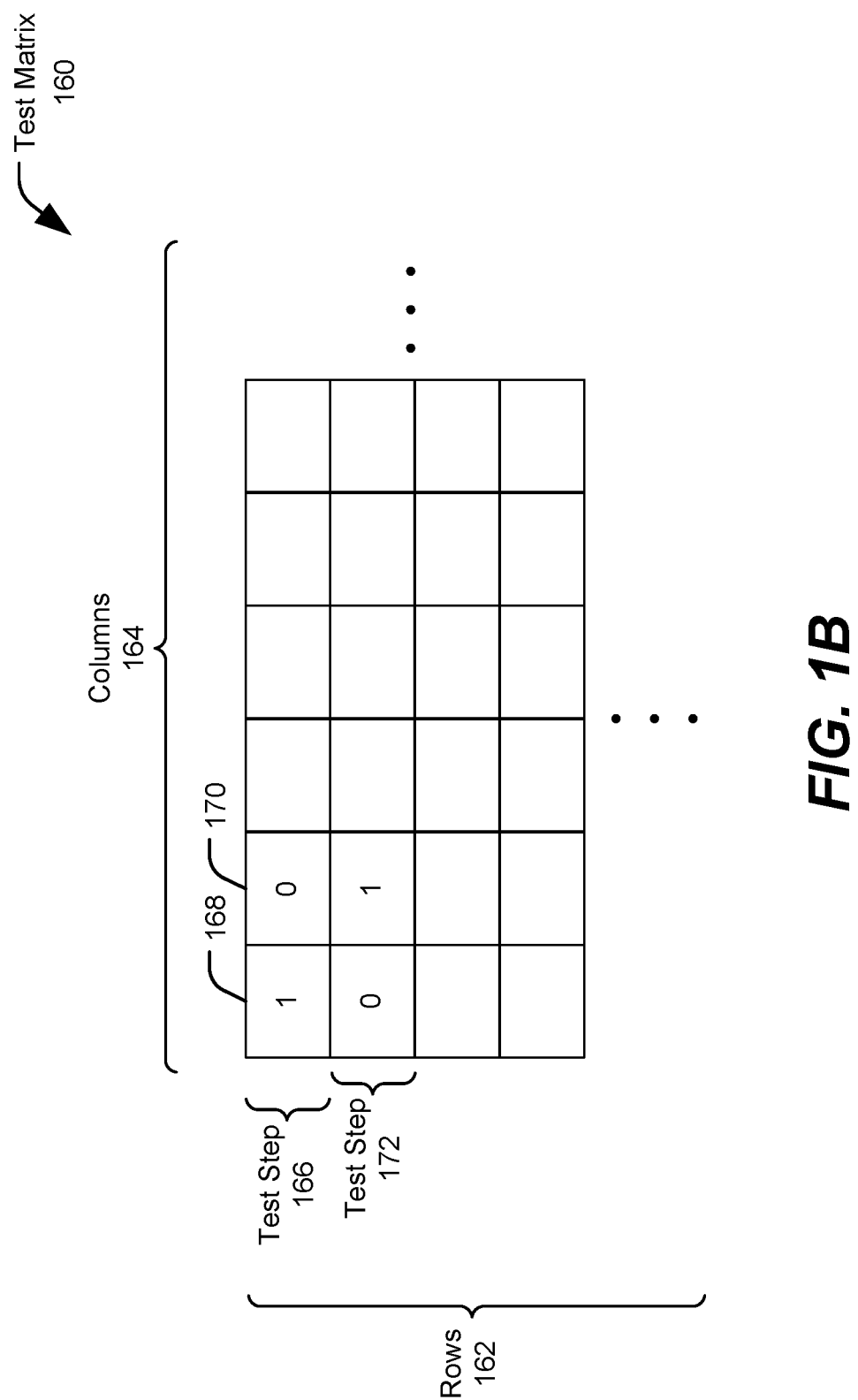

ADAPTIVE GAIN ADJUSTMENT FOR A FATIGUE TEST APPARATUS

FIELD

The present disclosure is generally related to fatigue testing of articles under test and more specifically to gain adjustment during fatigue testing.

BACKGROUND

Mechanical tests are used to determine and test structural characteristics of materials. For example, a component or structure of a vehicle or a building can be subjected to various tests such as hardness testing, tensile testing, impact testing, fracture testing, creep testing, and fatigue testing.

Fatigue testing can be performed on a structure to determine or test characteristics of the structure, such as the rate of growth of a fatigue crack in the structure in response to application of stress on the structure. In some systems, a test rig includes one or more actuators configured to stress the structure by applying different amounts or locations of force to the structure. In one example of a fatigue test, a relatively large number of actuators is connected to a structure, and different combinations of the actuators are used to apply different amounts or locations of stress to the structure.

In some cases, a fatigue test involves many different types and amounts of stress. Further, each step of the fatigue test can be applied over a long time interval, such as weeks or months in some cases. As a result, some fatigue tests are expensive and lengthy, increasing production cost and delays associated with some products.

SUMMARY

In a particular example, a fatigue test apparatus includes a control system configured to receive, during a first iteration of a fatigue test of an article under test, a command signal corresponding to a particular test step of the fatigue test. The control system is configured to generate, based on the command signal and during the first iteration, a test output signal to cause a force to be applied to the article under test. The control system is configured to generate an error signal associated with the particular test step during the first iteration. The fatigue test apparatus further includes a gain calculation device coupled to the control system. The gain calculation device is configured to generate, based on the error signal, a gain adjustment value associated with the particular test step. The fatigue test apparatus further includes a variable gain feedforward device coupled to the gain calculation device and to the control system. The variable gain feedforward device is configured to provide, during a second iteration of the fatigue test and based on the gain adjustment value, a stabilization gain to the control system.

In another example, a method includes receiving, by a control system and during a first iteration of a fatigue test of an article under test, a command signal corresponding to a particular test step of the fatigue test. The method further includes generating, based on the command signal and during the first iteration, a test output signal to cause a force to be applied to the article under test. An error signal associated with the particular test step is generated during the first iteration. The method further includes generating, by a gain calculation device coupled to the control system, a gain adjustment value associated with the particular test step based on the error signal. A variable gain feedforward device is coupled to the gain calculation device and to the control system. During a second iteration of the fatigue test, the variable gain feedforward device provides a stabilization gain to the control system based on the gain adjustment value.

In another example, a computer-readable medium stores instructions executable by a processor to initiate, control, or perform operations. The operations include receiving, by a control system and during a first iteration of a fatigue test of an article under test, a command signal corresponding to a particular test step of the fatigue test. The operations further include generating, based on the command signal and during the first iteration, a test output signal to cause a force to be applied to the article under test. An error signal associated with the particular test step is generated during the first iteration. The operations further include generating, by a gain calculation device coupled to the control system, a gain adjustment value associated with the particular test step based on the error signal. A variable gain feedforward device is coupled to the gain calculation device and to the control system. During a second iteration of the fatigue test, the variable gain feedforward device provides a stabilization gain to the control system based on the gain adjustment value.

BRIEF DESCRIPTION OF THE DRAWINGS

FIG. 1B is a diagram illustrating an example of a test matrix of a fatigue test that is performed by the fatigue test apparatus of FIG. 1A in accordance with certain aspects of the disclosure.

DETAILED DESCRIPTION

Figure 1A:
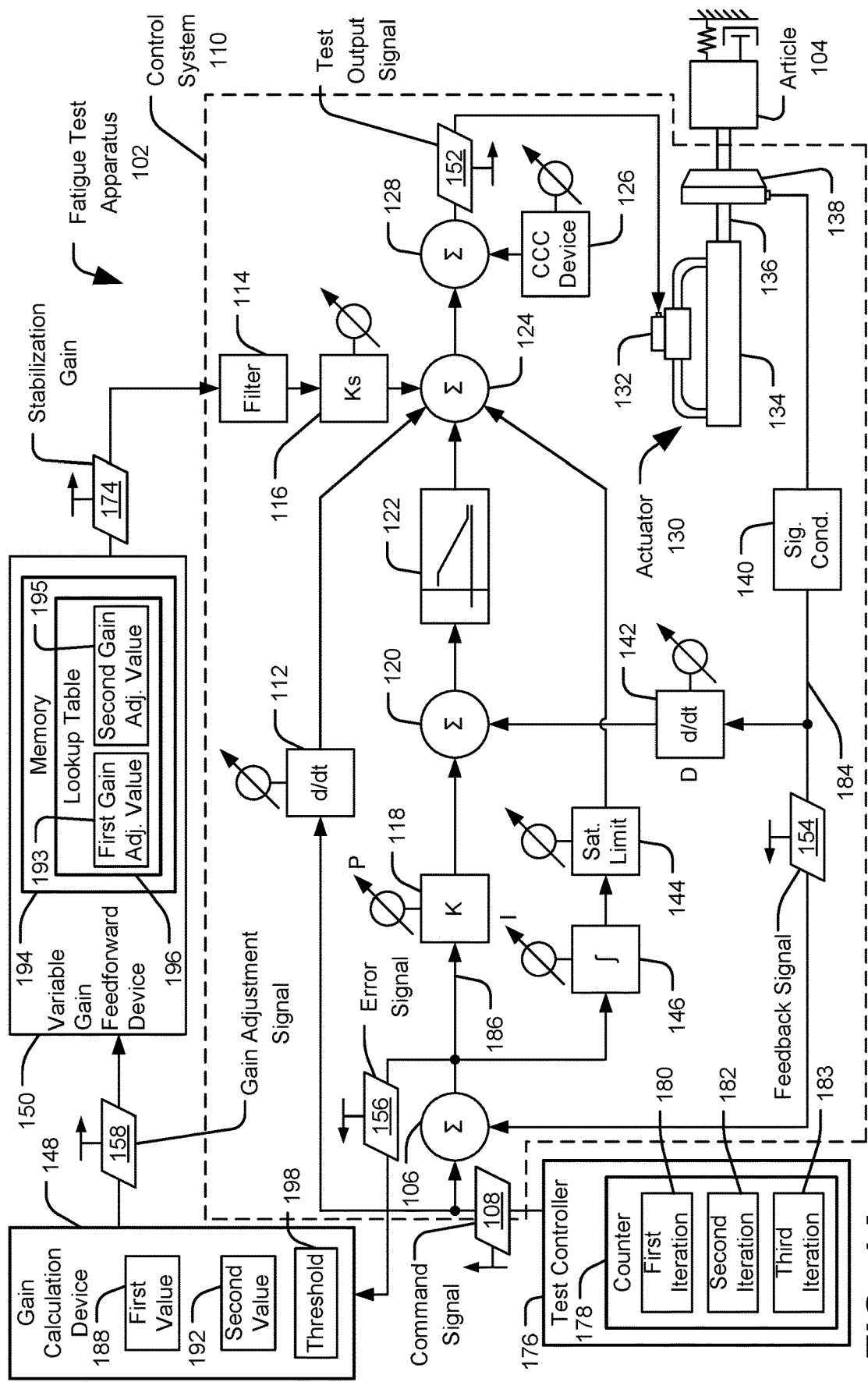
FIG. 1A is a diagram illustrating an example of a system including a fatigue test apparatus configured to repeatedly apply force to an article under test in accordance with certain aspects of the disclosure.

In accordance with some aspects of the disclosure, a fatigue test apparatus includes a control system configured to apply force to an article under test in connection with a fatigue test of the article. The fatigue test apparatus is configured to repeat the fatigue test over multiple iterations (e.g., by performing the fatigue test multiple times). In some examples, each iteration of the fatigue test includes one or more test steps specified by a fatigue test matrix (e.g., where each row of the fatigue test corresponds to a respective test step, and where coefficients of a row indicate which actuators are to be activated during a corresponding test step).

During a particular test step, the control system is configured to receive a command signal (e.g., one or more values associated with the particular test step) and to generate a test output signal in response to the command signal. The test output signal causes one or more actuators of the control system to apply force to the article under test. During the particular test step, the control system is configured to generate an error signal (e.g., a signal indicating a difference between an expected amount of force applied to the article and an actual amount of force applied to the article).

The fatigue test apparatus further includes a gain calculation device configured to determine gain adjustment values based on the error signal. In one example, the gain calculation device determines a first gain adjustment value during a first iteration of the particular test step, and a variable gain feedforward device stores the first gain adjustment value in a lookup table (e.g., to be used for a subsequent iteration of the test step). In some implementations, the variable gain feedforward device is configured to access the lookup table, during a second iteration of the test step, to identify the first gain adjustment value and to provide a stabilization gain to the control system based on the first gain adjustment value.

In some examples, application of the stabilization gain to the control system reduces or eliminates an overshoot or undershoot condition. As a non-limiting example, in some cases, a difference between a target deformation of the article under test and an actual deformation of the article under test can result in an undershoot (where the actual deformation is at least momentarily less than the target deformation) or in an overshoot (where the actual deformation is at least momentarily greater than the target deformation). Certain fatigue tests include adjusting force applied by each actuator until the article under test reaches the target deformation (e.g., until the forces applied by the actuators converge to a steady state). In some fatigue tests, adjusting forces applied by actuators takes a relatively long period of time (e.g., days or months, etc.), increasing time until a steady state is reached during the fatigue test. Because certain fatigue tests can depend on or require reaching a steady state, an overshoot or undershoot condition can delay each iteration of the fatigue test for a relatively long period of time (e.g., days or months), increasing cost of the fatigue test. By determining a stabilization gain based on data generated during one iteration of the test step and by applying the stabilization gain to the control system during a subsequent iteration of the test step, an overshoot or undershoot condition can be reduced or avoided during the subsequent iteration of the test step, reducing duration of the fatigue test in some cases.

Particular aspects of the disclosure are described further below with reference to the drawings. In the description, common features are designated by common reference numbers. Various terminology is used for the purpose of describing particular implementations only and is not intended to be limiting of implementations. For example, the singular forms "a," "an," and "the" are intended to include the plural forms as well, unless the context clearly indicates otherwise. The terms "comprises" and "comprising" are used interchangeably with "includes" or "including." Additionally, the term "wherein" is used interchangeably with "where." As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

Further, terms such as "determining", "calculating", "shifting", "adjusting", etc. can be used to describe how one or more operations are performed. It should be noted that such terms are not to be construed as limiting and other techniques can be utilized to perform similar operations. Additionally, as referred to herein, "generating", "calculating", "using", "selecting", "accessing", and "determining" can be used interchangeably. For example, "generating", "calculating", or "determining" a parameter (or a signal) can refer to actively generating, calculating, or determining the parameter (or the signal) or to using, selecting, or accessing the parameter (or signal) that is already generated, such as by another component or device.

Referring to FIG. 1A, a particular example of system includes a fatigue test apparatus 102 (e.g., a test rig) and an article 104 under test that is coupled to the fatigue test apparatus 102. The fatigue test apparatus 102 is configured to repeatedly apply force to the article 104 under test.

The fatigue test apparatus 102 includes a command input node 106 configured to receive command signals, such as a command signal 108. The fatigue test apparatus 102 further includes a control system 110. The control system 110 includes or is coupled to the command input node 106. The control system 110 is coupled to the article 104. In some examples, the control system 110 corresponds to a proportional (P), integral (I), and derivative (D) (PID) controller.

In the example of FIG. 1A, the control system 110 includes a gain stage 118 coupled to the command input node 106. FIG. 1A also illustrates that the control system 110 further includes a summation node 120, a forward loop filter 122, and a summation node 124. In FIG. 1A, the control system 110 includes a filter 114 coupled to a gain stage 116 that is coupled to the summation node 124.

The fatigue test apparatus 102 further includes one or more actuators, such as a representative actuator 130. Although FIG. 1A depicts a single actuator 130 for illustration, it is noted that the fatigue test apparatus 102 can include multiple actuators corresponding to the actuator 130.

In the example of FIG. 1A, the actuator 130 includes a servo valve 132, a cylinder 134, and a rod 136. In some implementations, one or both of a force transducer or a position sensor (e.g., a force transducer and position sensor 138) are coupled between the actuator 130 and the article 104. The actuator 130 is configured to apply force to the article 104 (e.g., via the rod 136 and the force transducer and position sensor 138), such as during one or more stages of a fatigue test of the article 104.

FIG. 1A also illustrates that the control system 110 includes a cross coupling compensation (CCC) device 126. In some examples, the CCC device 126 is configured to store indications of gain values associated with other actuators of the control system 110 and to apply, to a summation node 128, a particular actuator gain based on one or more particular actuators activated during a particular test step.

In some examples, the summation node 128 is coupled to the CCC device 126 and to the summation node 124. In FIG. 1A, a differentiator 112 is coupled to the command input node 106 and to the summation node 124.

FIG. 1A further depicts that the control system 110 includes a signal conditioner 140 coupled to a differentiator 142 and to the command input node 106. The differentiator 142 is coupled to the summation node 120. A saturation limiter 144 is coupled to an integrator 146 and to the summation node 124.

In a particular example, the control system 110 includes a feedback loop 184. In one example, the feedback loop 184 is coupled between the force transducer and position sensor 138 and the command input node 106. FIG. 1A also depicts that the control system 110 includes a feedforward loop 186 coupled to an output of the command input node 106.

The fatigue test apparatus 102 further includes a gain calculation device 148 coupled to the control system 110. In the example of FIG. 1A, the gain calculation device 148 is coupled to the command input node 106 and to the integrator 146. In a particular example, the gain calculation device 148 is coupled to an output of the command input node 106.

The fatigue test apparatus 102 also includes a variable gain feedforward device 150. The variable gain feedforward device 150 is coupled to the gain calculation device 148. The variable gain feedforward device 150 is also coupled to the control system 110 (e.g., via the filter 114).

In some examples, the fatigue test apparatus 102 includes a test controller 176 coupled to the control system 110. In some implementations, the test controller 176 is configured to initiate different test steps of a fatigue test of the article 104, such as by providing command signals (e.g., the command signal 108) to the command input node 106. In some examples, the test controller 176 includes a counter 178 configured to store values indicating different iterations of the test steps, such as a first iteration 180 of the test steps and a second iteration 182 of the test steps. In some examples, each test step of the fatigue test corresponds to a respective row of a test matrix, and performing each iteration of the fatigue test includes performing each test step associated with the test matrix. It is noted that the first iteration 180 and the second iteration 182 are not necessarily limited to the chronologically first and second iterations of the fatigue test (e.g., the first iteration 180 may not necessarily be the initial iteration of the fatigue test).

To further illustrate, in FIG. 1B, a particular illustrative example of a test matrix is depicted and generally designated 160. In some implementations, the test controller 176 is configured to store the test matrix 160, other test information, or a combination thereof.

The test matrix 160 includes a plurality of rows 162 and a plurality of columns 164. In the particular example of FIG. 1B, the test matrix 160 includes four rows 162 and six columns 164. In other examples, the test matrix 160 can include a different number of rows 162, a different number of columns 164, or both.

Each row of the rows 162 corresponds to a respective test step of a fatigue test, and the test steps of the test matrix 160 are repeated iteratively during the fatigue test. For example, in some implementations, each value (e.g., coefficient) of a row of the test matrix 160 specifies which one or more actuators of a plurality of actuators (e.g., the actuator 130) of the fatigue test apparatus 102 of FIG. 1A are to apply force to the article 104 of FIG. 1A.

To further illustrate, in some examples, a particular row of the test matrix 160 corresponds to a test step 166 of a fatigue test of the article 104 of FIG. 1A. In one illustrative example, a value of a bit 168 of the particular row indicates whether the actuator 130 is to be actuated during the particular test step, and a value of a bit 170 of the particular row indicates whether another actuator of the fatigue test apparatus 102 is to be actuated during the particular test step. In one illustrative example, a "1" value of the bit 168 indicates that the actuator 130 is to be actuated during the particular test step, and a "0" value of the bit 170 indicates that another actuator of the fatigue test apparatus 102 is not to be actuated during the particular test step. In other examples, different values can be used other than illustrated in FIG. 1B, such as by using non-binary values, as an illustrative example. In one example, each coefficient of the test matrix 160 has a value that indicates an amount of force to be applied by the corresponding actuator (e.g., where each coefficient has a value selected from a range of 0 to 10, and where a greater value indicates a greater amount of force as compared to a lower value, as an illustrative example). Further, in some implementations, the test matrix 160 (or other test data) specifies other information, such as a target deformation of the article 104 to be achieved during the fatigue test.

In some examples, other rows of the plurality of rows 162 have other permutations of values of bits corresponding to different test steps of the fatigue test. To illustrate, in FIG. 1B, a test step 172 has different values of the bits 168, 170 as compared to the test step 166.

Referring again to FIG. 1A, during operation, the command input node 106 receives command signals, such as the command signal 108, from the test controller 176. In one example, the command input node 106 is configured to receive the command signal 108 during the first iteration 180 of the test steps of the test matrix 160.

The control system 110 is configured to generate, based on the command signal 108, a test output signal 152 to cause a force to be applied to the article 104 (e.g., during the test step 166). For example, in some implementations, the test output signal 152 causes one or more actuators of the fatigue test apparatus 102 to apply a force to the articular under test 104. As a particular example, the test output signal 152 can cause the actuator 130 to apply force to the article 104 via the rod 136 and the force transducer and position sensor 138.

The control system 110 is configured to generate a feedback signal 154 based on a result of applying force to the article 104 (e.g., during the test step 166). In some examples, the force transducer and position sensor 138 is configured to generate the feedback signal 154, and the feedback signal 154 indicates an amount of force applied to the article 104. In one example, the feedback loop 184 is configured to provide the feedback signal 154 to the command input node 106.

The control system 110 is configured to generate an error signal 156 associated with a particular test step (e.g., a particular test step corresponding to a particular row of the test matrix 160). To illustrate, in some examples, the command input node 106 is configured to determine a difference between the test output signal 152 and the feedback signal 154 to generate the error signal 156 (e.g., by subtracting the feedback signal 154 from the test output signal 152, or vice versa).

To further illustrate, in one example, the test controller 176 stores test information specifying a target deformation of the article 104, and the test output signal 152 is configured to cause the actuator 130 to apply the force to the article 104 to achieve the target deformation of the article 104. In a particular example, the target deformation corresponds to a particular shape of the article 104 to be achieved using a plurality of actuators including the actuator 130. In some examples, the error signal 156 indicates a deviation between a measured deformation of the article 104 and the target deformation.

The gain calculation device 148 is configured to generate, based on the error signal 156, a gain adjustment signal 158 associated with the test step 166. In some examples, the gain adjustment signal 158 corresponds to a value that is used to reduce a magnitude of the error signal 156 during a subsequent iteration of the test step 166 (after the first iteration 180), such as during the second iteration 182 of the test step 166.

As a non-limiting illustrative example, in some implementations, the error signal 156 indicates an error of 2.0% associated with the test step 166 during the first iteration 180. In some examples, in response to the error of 2.0%, the gain calculation device 148 selects a first gain adjustment value 193 of the gain adjustment signal 158 (e.g., 0.4, or another value) and provides the first gain adjustment value 193 to the variable gain feedforward device 150. In some implementations, the gain calculation device 148 is configured to determine the first gain adjustment value 193 based on a first value 188, as described further below.

The variable gain feedforward device 150 is configured store the first gain adjustment value 193 for use during a subsequent iteration of the test step 166 (after the first iteration 180), such as during the second iteration 182 of the test step 166. To further illustrate, in the example of FIG. 1A, the variable gain feedforward device 150 includes a memory 194 configured to store a lookup table 196. In a particular example, the variable gain feedforward device 150 is configured to store the first gain adjustment value 193 in the lookup table 196 during the first iteration 180 of the test step 166 and to retrieve the first gain adjustment value 193 from the lookup table 196 for use during one or more subsequent iterations of the test step 166, such as during the second iteration 182 of the test step 166.

In some examples, after performing the test step 166, one or more other test steps associated with the test matrix 160 are performed during the first iteration 180. To illustrate, in one example, the fatigue test apparatus 102 performs the test step 172 during the first iteration 180 (after performing the test step 166 during the first iteration 180). In a particular example, the first iteration 180 of the fatigue test is completed after performance of each test step associated with the test matrix 160.

In some examples, after performing the first iteration 180 of the fatigue test of the article 104, the fatigue test apparatus 102 performs one or more additional iterations of the fatigue test. For example, certain test protocols specify that a fatigue test is repeated to cycle a load applied to the article 104.

The variable gain feedforward device 150 is configured to provide, during the second iteration 182 of one or more test steps of the test matrix 160, a stabilization gain 174 to the control system 110 (e.g., to the filter 114). The stabilization gain 174 is based on one or more values of the gain adjustment signal 158. In one example, during the second iteration 182 of the test step 166, the stabilization gain 174 includes or corresponds to the first gain adjustment value 193. To further illustrate, in one example, gain adjustment values (e.g., the first gain adjustment value 193) are digital values, and the variable gain feedforward device 150 includes a digital-to-analog converter (DAC) circuit configured to generate an analog signal based on each digital value to generate the stabilization gain 174 (e.g., to cause the stabilization gain 174 to have a current magnitude corresponding to the first gain adjustment value 193).

To further illustrate, in some implementations, the variable gain feedforward device 150 is configured to select a value of the stabilization gain 174 by accessing the lookup table 196. In some examples, the variable gain feedforward device 150 is configured to select, as the value of the stabilization gain 174, a value of the gain adjustment signal 158 from a previous iteration of the fatigue test. In one example, the variable gain feedforward device 150 is configured to select, as the value of the stabilization gain 174 during the test step 166 of the second iteration 182, the first gain adjustment value 193 (e.g., by selecting the first gain adjustment value 193 from the lookup table 196). As will be appreciated, in some implementations, the stabilization gain 174 has a zero or null value during the first iteration 180. Alternatively, in other examples, the stabilization gain 174 can have one or more other values during the first iteration 180 (e.g., a default value or another value).

In some examples, the variable gain feedforward device 150 is configured to receive an indication of the particular iteration of the fatigue test and to perform a lookup operation at the lookup table 196 based on the indication of the particular iteration. To illustrate, in some examples, the variable gain feedforward device 150 is coupled to the test controller 176 (e.g., to the counter 178) and is configured to receive the indication of the particular iteration from the test controller 176 (e.g., by receiving a first index value associated with the first iteration 180, a second index value associated with the second iteration 182, etc.). In some examples, the lookup table 196 is indexed by the index values associated with iterations of the fatigue test (e.g., where the second index value associated with the second iteration 182 is associated with the first gain adjustment value 193 in the lookup table 196).

In some examples, the variable gain feedforward device 150 is configured to select a value of the stabilization gain 174 to cause a second deviation between a target deviation and a second measured deformation of the article 104 associated with the test step 166 during the second iteration 182 to be less than the deviation associated with the particular test step during the first iteration 180. In this example, the stabilization gain 174 can result in the second measured deformation more closely matching a target deviation of the article 104 (as compared to the first measured deformation relative to the target deviation), which can reduce or eliminate one or more overshoot or undershoot conditions associated with the error signal 156.

The gain calculation device 148 is configured to determine, during the second iteration 182 of the test step 166, a second value 192 based on one or more values of the error signal 156 during the second iteration 182. In an illustrative example, the second value 192 is based on test results of applying the stabilization gain 174 (e.g., the first value 194) to the control system 110. In one example, the first gain adjustment value 193 is provided to the control system 110 as the stabilization gain 174 during the second iteration 182 of the test step 166. In a particular example, in response to application of the first gain adjustment value 193 during the second iteration 182 of the test step 166, the control system 110 generates a second magnitude of the error signal 156 (e.g., where the second magnitude is less than a first magnitude of the error signal 156 associated with the first iteration 180 of the test step 166). In this example, the gain calculation device 148 is configured to determine, during the second iteration 182 of the test step 166, the second value 192 based on the second magnitude of the error signal 156.

To further illustrate, in one non-limiting example, the error signal 156 indicates an error of 0.5% associated with the test step 166 during the second iteration 182 (e.g., after indicating an error of 2.0% associated with the test step 166 during the first iteration 180). In some examples, in response to the error of 0.5% during the second iteration 182 of the test step 166, the gain calculation device 148 determines the second value 192.

In a particular example, the fatigue test apparatus 102 is configured to determine a second gain adjustment value 195 during the second iteration 182 of the test step 166 based on values of the gain adjustment signal 158 from prior iterations of the test step 166 and further based on a current value of the gain adjustment signal 158 associated with the second iteration 182 (e.g., based on the first value 188 and the second value 192). In some implementations, the fatigue test apparatus 102 is configured to determine each gain of the stabilization gain 174 based on a sum of prior values of the gain adjustment signal 158 (e.g., where the second gain adjustment value 195 is a sum of the first value 188 and the second value 192). In some examples, each subsequent gain adjustment value is less than a prior gain adjustment value (e.g., where the second gain adjustment value 195 is less than the first gain adjustment value 193).

To further illustrate, if the error signal 156 indicates an error of 0.5% during the test step 166 during the second iteration 182 (e.g., while the stabilization gain 174 has a value of 0.4), then the second gain adjustment value 195 can be determined as 0.5=0.4+0.1. In this particular example, the first value 188 corresponds to 0.4, the second value 192 corresponds to 0.1, the first gain adjustment value 193 corresponds to 0.1, and the second gain adjustment value 195 corresponds to 0.5.

In some implementations, the variable gain feedforward device 150 is configured to store the second gain adjustment value 195 at the memory 194 (e.g., within the lookup table 196). In a particular example, the variable gain feedforward device 150 is configured to access the second gain adjustment value 195 for use during a subsequent iteration (e.g., a third iteration 183) of the test step 166 (e.g., while determining a third gain during the third iteration 183 based on results of applying the second gain adjustment value 195 during the third iteration 183). In a non-limiting example, the third gain is equal to 0.125. In a particular example, the variable gain feedforward device 150 is configured to adjust the stabilization gain 174, during the third iteration 183 of the test step 166, based on the second gain adjustment value 195. For example, in some implementations, the variable gain feedforward device 150 includes a DAC circuit configured to adjust the stabilization gain 174 by generating an analog signal based on the second gain adjustment value 195 (e.g., to cause the stabilization gain 174 to have a current magnitude corresponding to the second gain adjustment value 195).

In some implementations, iterative adjustment (e.g., reduction) of the stabilization gain 174 continues until the error signal 156 is less than (or is less than or equal to) a threshold 198. In some examples, the gain calculation device 148 includes a comparator configured to compare the error signal 156 to the threshold 198. In response to determining that a value of the error signal 156 is less than the threshold 198, a most recent (e.g., current) value of the stabilization gain 174 can be set and used for one or more subsequent iterations of the fatigue test (e.g., until the error signal 156 satisfies the threshold 198 during a subsequent iteration).

Use of the stabilization gain 174 during one or more iterations of a fatigue test of the article 104 that occur subsequent to the first iteration 180 can reduce or avoid an overshoot condition associated with the fatigue test, an undershoot condition associated with the fatigue test, or both. As a non-limiting example, in some cases, a difference between a target deformation specified by the test step 166 and an actual deformation of the article 104 can result in an undershoot (where the actual deformation is at least momentarily less than the target deformation) or in an overshoot (where the actual deformation is at least momentarily greater than the target deformation). Certain fatigue tests include adjusting force applied by each actuator until the article under test reaches the target deformation (e.g., until the forces applied by the actuators converge to a steady state). In some fatigue tests, adjusting forces applied by actuators takes a relatively long period of time (e.g., days or months, etc.), increasing time until a steady state is reached during the fatigue test. Because certain fatigue tests can depend on or require reaching a steady state, an overshoot or undershoot condition can delay each iteration of a fatigue test for a relatively long period of time (e.g., days or months), increasing cost of the fatigue tests.

Figure 1C:
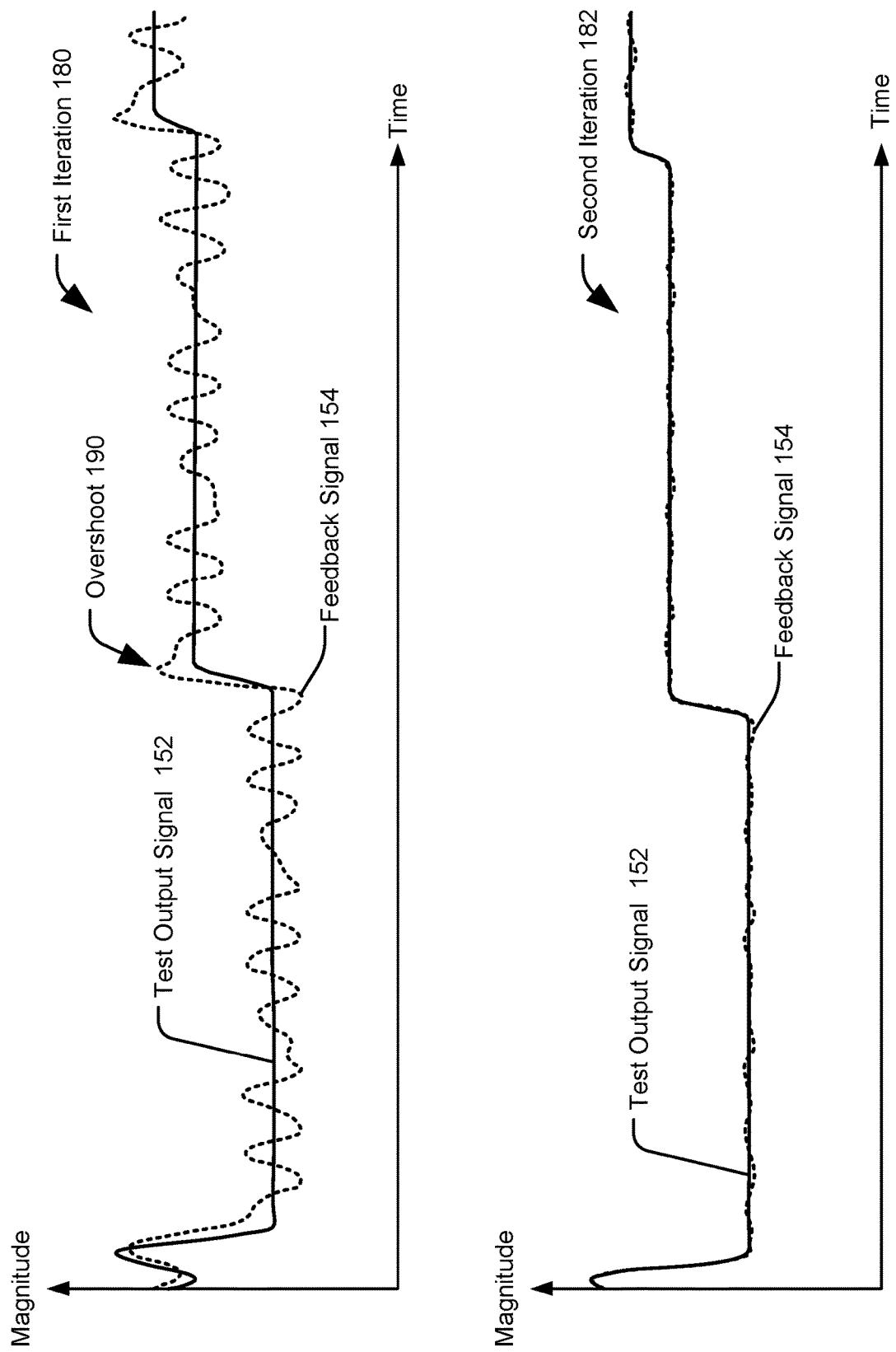
FIG. 1C is a diagram illustrating certain aspects of a first iteration and a second iteration of a fatigue test that is performed by the fatigue test apparatus of FIG. 1A in accordance with certain aspects of the disclosure.

To further illustrate, FIG. 1C depicts certain illustrative examples of values of the test output signal 152 and the feedback signal 154 during the first iteration 180 and during the second iteration 182. In the example of FIG. 1C, the abscissa indicates time, and the ordinate indicates magnitude (e.g., voltage, current, or power) associated with the test output signal 152 and the feedback signal 154.

FIG. 1C depicts that the stabilization gain can reduce or avoid overshoot conditions associated with the feedback signal 154, undershoot conditions associated with the feedback signal 154, or both. To illustrate, during the first iteration 180, the feedback signal 154 is associated with an overshoot 190. During the second iteration 182, the overshoot 190 is reduced or eliminated using the stabilization gain 174.

By determining the stabilization gain 174 during the first iteration 180 of the fatigue test and applying the stabilization gain 174 during one or more iterations of the fatigue test subsequent to the first iteration 180 as described with reference to FIGS. 1A-1C, overshoot or undershoot conditions can be reduced or avoided during the subsequent iterations. For example, an overshoot condition can be reduced or avoided using a negative value of the stabilization gain 174 (e.g., to reduce a magnitude of the test output signal 152, attenuating force applied to the article 104). As another example, an undershoot condition can be reduced or avoided using a positive value of the stabilization gain 174 (e.g., to increase a magnitude of the test output signal 152, increasing force applied to the article 104). As a result, delay associated with reaching steady state and cost of a fatigue test are reduced.

Figure 2A:
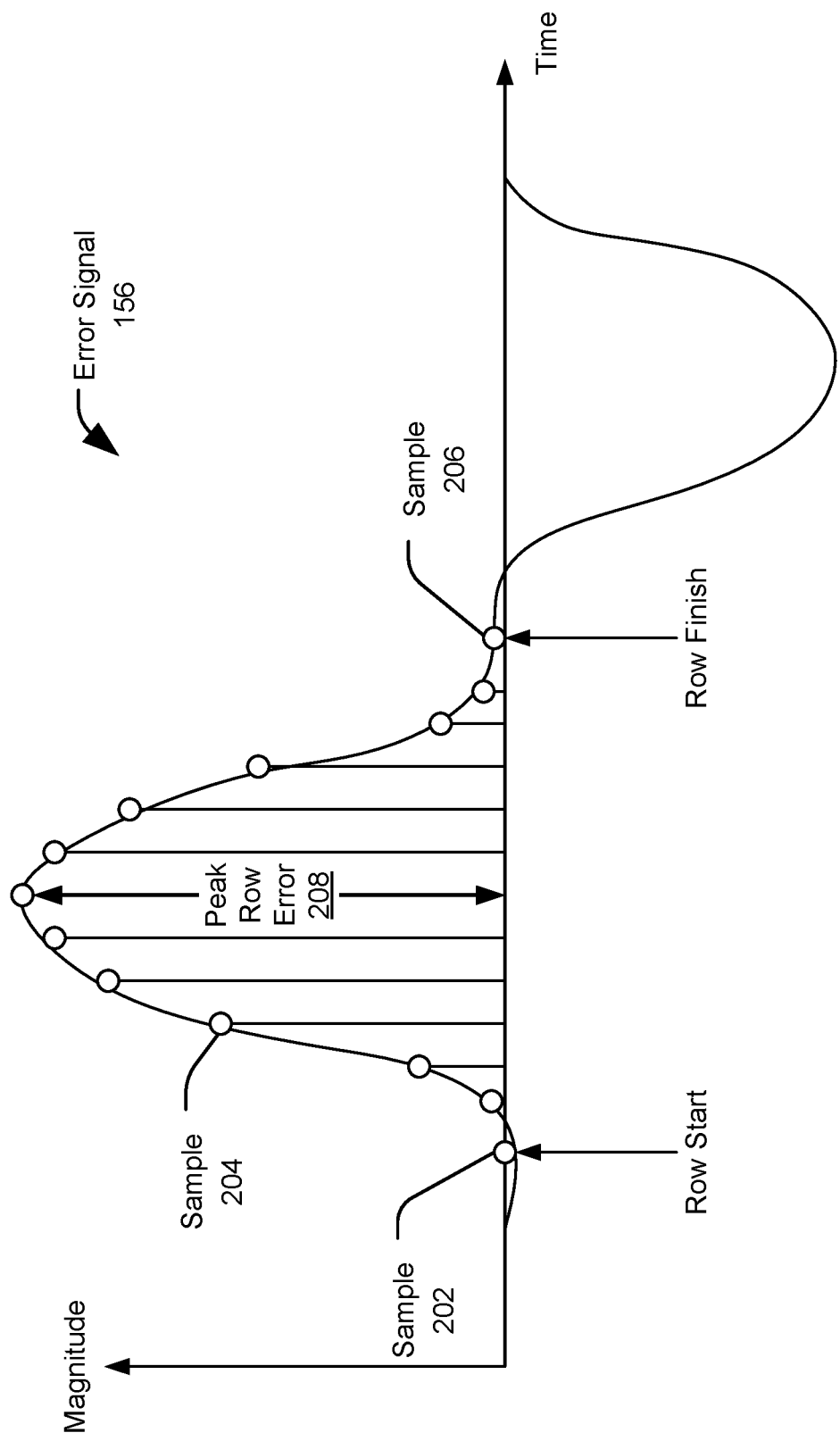
FIG. 2A is diagram illustrating certain aspects of an example of an error signal generated by the fatigue test apparatus of FIG. 1A in accordance with certain aspects of the disclosure.

FIG. 2A depicts certain aspects associated with an example of the error signal 156. In the example of FIG. 2A, the abscissa indicates time, and the ordinate indicates magnitude (e.g., voltage, current, or power) associated with the error signal 156. In FIG. 2A, the error signal 156 has a relatively low magnitude during initiation ("row start") of a test step (e.g., the test step 166 of FIG. 1B) and during completion ("row finish") of the test step.

In some implementations, the gain calculation device 148 of FIG. 1A is configured to receive the error signal 156 and to sample the error signal 156 to generate a plurality of samples, such as samples 202, 204 and 206. In some examples, the gain calculation device 148 is configured to digitize the error signal 156 using an analog-to-digital converter (ADC) circuit to generate the samples 202, 204, and 206. In some examples, the plurality of samples includes positive values of the error signal 156 and excludes negative values of the error signal 156.

In a particular example, the gain calculation device 148 of FIG. 1A is configured to determine a peak row error 208 based on the error signal 156. In one example, the gain calculation device 148 is configured to identify the peak row error 208 by comparing samples of the error signal 156 (e.g., using a comparator circuit) and identifying which of the samples has a greater magnitude than the other samples. In some examples, the gain calculation device 148 is configured to determine the peak row error 208 using a scalar value ("Scalar1"). To illustrate, in some examples, the gain calculation device 148 is configured to determine the peak row error 208 based on Equation 1:

$$\text{Peak Error} = \left( \frac{\sum_{Row\ Finish}^{Row\ Start} \text{Errors}}{\text{Samples}} \right) * \text{Scalar1}. \quad \text{(Equation 1)}$$

Figure 2B:
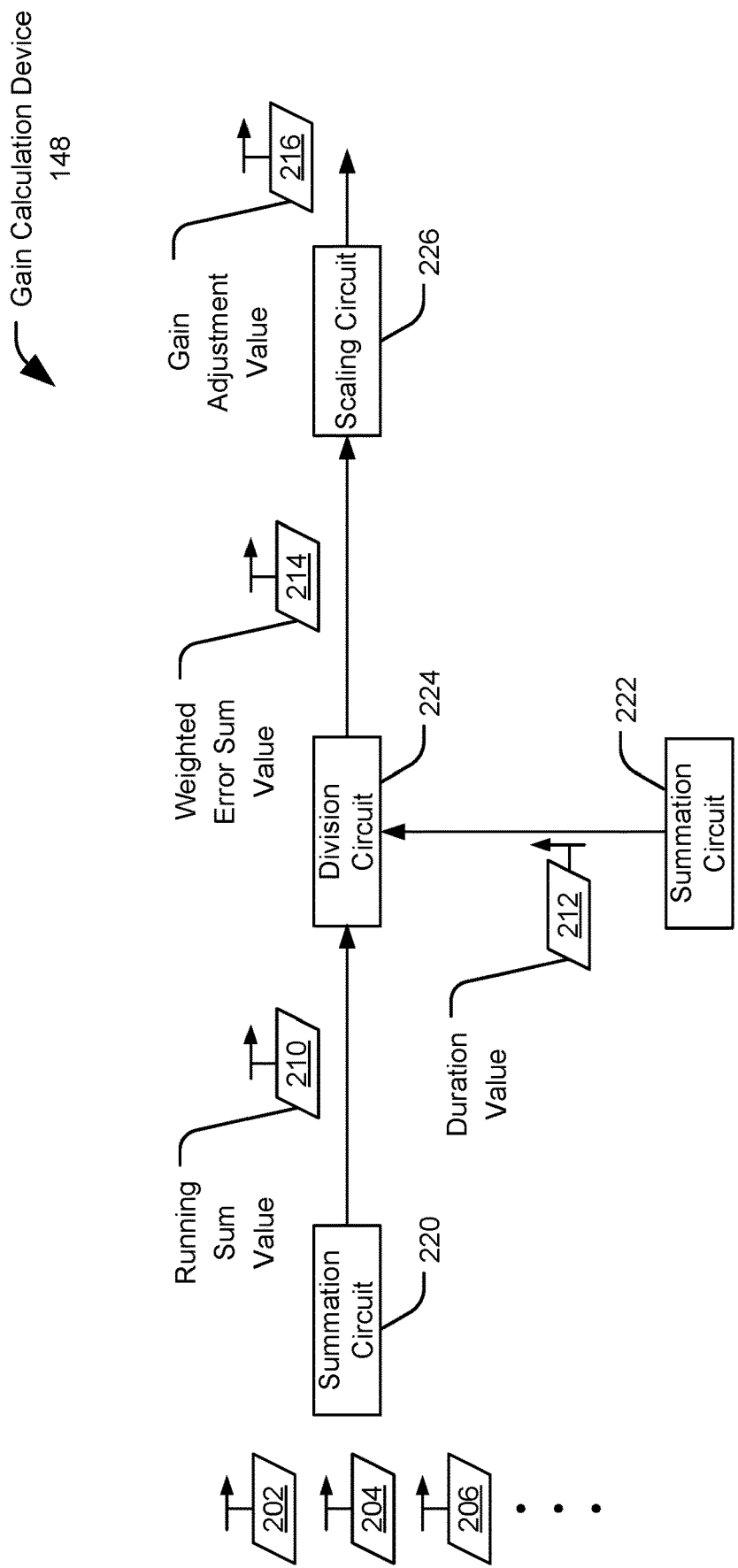
FIG. 2B is a diagram illustrating certain aspects of an example of a circuit that is included in the fatigue test apparatus of FIG. 1A in accordance with certain aspects of the disclosure.

To further illustrate, FIG. 2B depicts an example of a device that is included in the gain calculation device 148 in some implementations. In FIG. 2B, the gain calculation device 148 includes a summation circuit 220, a summation circuit 222, and a division circuit 224 coupled to the summation circuits 220, 222. In FIG. 2B, the gain calculation device 148 further includes a scaling circuit 226 coupled to the division circuit 224.

The example of FIG. 2B illustrates that the gain calculation device 148 is configured to receive (or generate) multiple samples of the error signal (e.g., the samples 202, 204, and 206, one or more other samples, or a combination thereof). In a particular example, the multiple samples are associated with a particular row of the test matrix 160 (e.g., where the multiple samples are received during a particular test step, such as the test step 166). In a particular example, the gain calculation device 148 is configured to determine a running sum value 210 associated with the multiple samples. For example, in FIG. 2B, the summation circuit 220 is configured to determine the running sum value 210. In some examples, the running sum value 210 corresponds to $\Sigma_{Row\ Finish}^{Row\ Start}$ Errors in Equation 1.

In some examples, the gain calculation device 148 is configured to determine a duration value 212 (e.g., Samples in Equation 1) associated with the error signal 156. The duration value 212 is associated with a time interval corresponding to the particular row of the test matrix 160. To illustrate, in some implementations, the summation circuit 222 is configured to generate the duration value 212 by summing a number of samples input to the summation circuit 220 or by summing a number of clock cycles associated with samples input to the summation circuit 220.

In some examples, the gain calculation device 148 is configured to perform a division operation to determine a weighted error sum value 214. In one example, the division circuit 224 is configured to divide the running sum value 210 by the duration value 212 to generate the weighted error sum value 214.

In some examples, the gain calculation device 148 is configured to scale the weighted error sum value 214 to determine a gain adjustment value 216. In some examples, the scaling circuit 226 is configured to multiply the weighted error sum value 214 by one or more scaling values (e.g., Scalar1 in Equation 1) to generate the gain adjustment value 216. In some examples, the gain adjustment value 216 corresponds to a particular value of the gain adjustment signal 158, such as the first value 188 or the second value 192.

In some examples, a value of Scalar1 is selected based on a number of samples of the error signal 156. In some implementations, a value of Scalar1 is reduced as a number of samples of the error signal 156 increases. As an illustrative example, in some implementations, Scalar1=2 if a number of samples of the error signal 156 is less than a particular number, and 1.5<Scalar1<2 if the number of samples of the error signal 156 is greater than or equal to the particular number. Alternatively, in other implementations, Scalar1 can have one or more other values.

In a particular example, the gain calculation device 148 is configured to determine the gain adjustment value 216 (e.g., Gain_Adjustment_01) based on Equation 2 or Equation 3:

$$\text{Gain\_Adjustment\_01} = \text{PeakError} * \text{Scalar2} \quad \text{(Equation 2)}.$$

In some examples, Equation 2 is expressed using a scaling value ("Gain1"), where Gain1=Scalar1*Scalar2, such as shown in Equation 3:

$$\text{Gain\_Adjustment\_01} = \left( \frac{\sum_{Row\ Finish}^{Row\ Start} \text{Errors}}{\text{Samples}} \right) * \text{Gain1}. \quad \text{(Equation 3)}$$

In some implementations, a value of Gain_Adjustment_1 is determined during each iteration of a fatigue test. In one example, a first value (e.g., the first value 188) of Gain_Adjustment_01 is determined during the first iteration 180 (e.g., while the variable gain feedforward device 150 generates one value of the stabilization gain 174 based on a null or zero value of Gain_Adjustment_01), and a second value (e.g., the second value 192) of Gain_Adjustment_01 is determined during the second iteration 182 (e.g., while the variable gain feedforward device 150 generates a different value of the stabilization gain 174 based on the first value of Gain_Adjustment_01). Accordingly, in some implementations, one value the gain adjustment signal 158 is determined during a particular iteration of a fatigue test while another value of the gain adjustment signal 158 determined during a prior iteration (or a null or zero value) is used to determine the stabilization gain 174.

In some examples, prior values and a current value of Gain_Adjustment_01 are iteratively summed to determine a gain adjustment value (e.g., the first gain adjustment value 193 or the second gain adjustment value 195) for a subsequent iteration. To illustrate, in one example, during a particular iteration of a fatigue test, a newly calculated value of Gain_Adjustment_01 (e.g., the second value 192) is summed with a prior value of Gain_Adjustment_01 (e.g., the first value 188) to generate the second gain adjustment value 195 for use in a subsequent iteration of the fatigue test.

To further illustrate, in one non-limiting example, the error signal 156 indicates an error of 2.0% associated with the test step 166 during the first iteration 180. In some examples, in response to the error of 2.0%, the Gain_Adjustment_01 is set to 0.4 and stored (e.g., as the first gain adjustment value 193 in the lookup table 196) for one or more subsequent iterations of the test step 166 (e.g., the second iteration 182). If the error signal 156 indicates an error of 0.5% during the test step 166 during the second iteration 182 (while using Gain_Adjustment_01=0.4), the previous value of Gain_Adjustment_01 (0.4) can be summed with a new value of Gain_Adjustment_01 (0.1) to generate another value (0.5) that is stored (e.g., as the second gain adjustment value 195 in the lookup table 196) for one or more subsequent iterations of the test step 166. In a particular example, the first value 188 corresponds to Gain_Adjustment_01=0.4, the second value 192 corresponds to Gain_Adjustment_01=0.1, the first gain adjustment value 193 corresponds to 0.4, and the second gain adjustment value 195 corresponds to 0.5. It will be appreciated that numerical examples are provided for illustration and that the disclosure is not limited to the particular examples.

In some examples, gain calculation during a particular iteration of the fatigue test is omitted (or ignored) if the error signal 156 is less than a threshold error value (e.g., the threshold 198). In this case, the gain calculation device 148 is configured to determine the gain adjustment value 216 in response to identifying that the error signal 156 satisfies a threshold, such as the threshold 198.

In some examples, operations described herein are performed on a per-row basis. For example, values of Gain_Adjustment_01 can be determined and used for each row of the test matrix 160 independently of other rows of the test matrix 160. Thus, in some examples, each test step associated with the test matrix 160 is associated with a corresponding value of Gain_Adjustment_01 that depends on one or more prior iterations of the test step (if any) where the error signal 156 satisfies a threshold error value.

In some examples, the fatigue test apparatus 102 is configured to perform certain operations described herein for each channel of multiple channels. As used herein, a channel can refer to a particular actuator of the fatigue test apparatus 102 or to another aspect of the fatigue test apparatus. In some cases, each channel is associated with a corresponding error signal, and a weighted sum of the error signals is determined (e.g., where the example of the error signal 156 in FIG. 2A corresponds to a weighted sum of the error signals). Thus, aspects of the disclosure are applicable to multi-channel implementations.

The examples described with reference to FIGS. 2A and 2B illustrate that gain calculation can be performed to determine a gain adjustment value (e.g., the gain adjustment value 216) during a particular iteration of a fatigue test. By applying the gain adjustment value 216 (or another gain adjustment value) to the control system 110 during a subsequent iteration of the fatigue test, overshoot or undershoot conditions can be reduced or avoided, reducing duration of the fatigue test.

Figure 3:
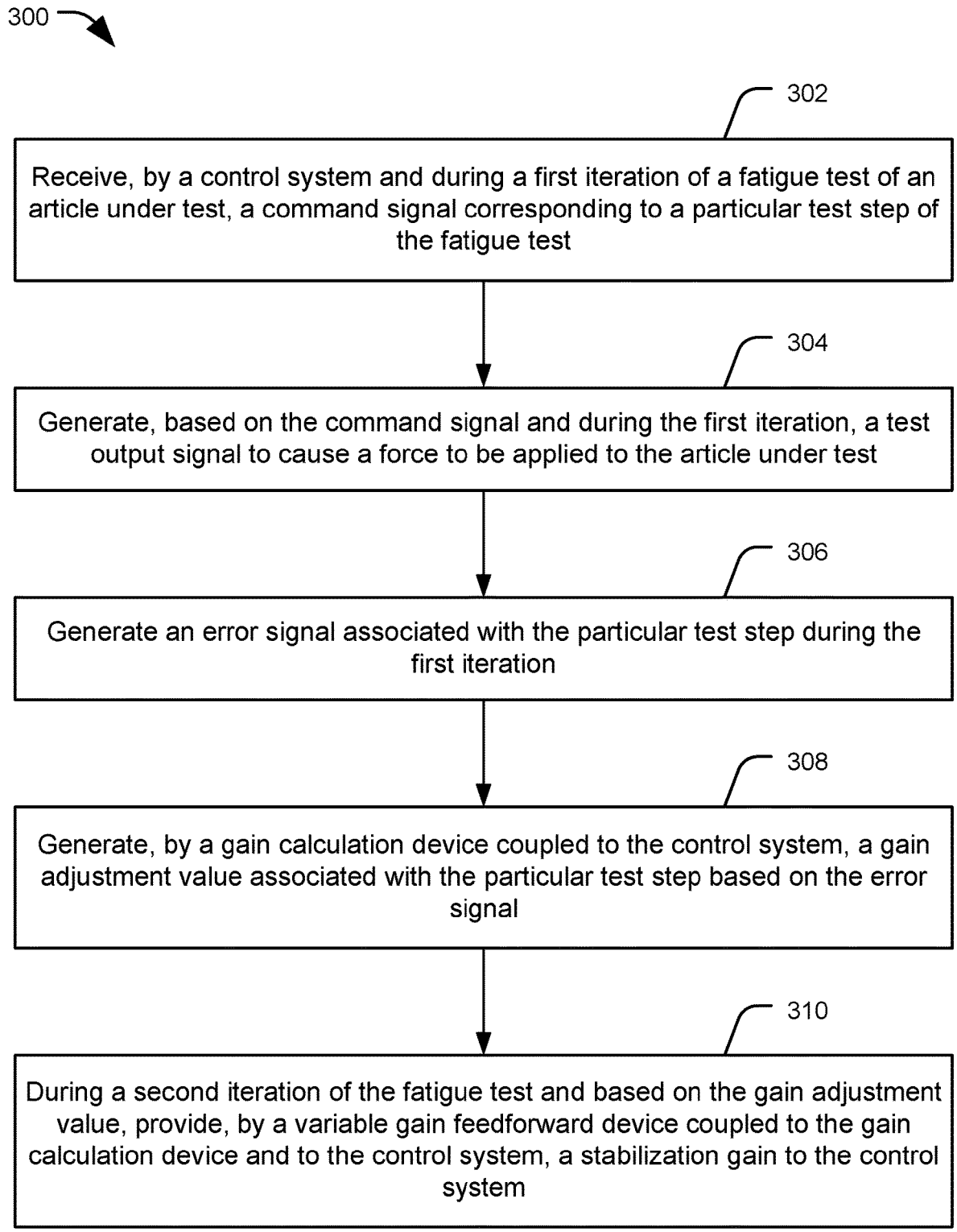
FIG. 3 is a flow chart of an example of a method of operating the system of FIG. 1A in accordance with aspects of the disclosure.

Referring to FIG. 3, a particular illustrative example of a method is depicted and generally designated 300. In a particular example, operations of the method 300 are performed by the fatigue test apparatus 102 of FIG. 1A.

The method 300 includes receiving, by a control system and during a first iteration of a fatigue test of an article under test, a command signal corresponding to a particular test step of the fatigue test, at 302. To illustrate, in some examples, the control system 110 is configured to receive the command signal 108 during the first iteration 180 of a fatigue test of the article 104. In one example, the command signal 108 corresponds to a particular test step associated with the test matrix 160, such as the test step 166.

The method 300 further includes generating, based on the command signal and during the first iteration, a test output signal to cause a force to be applied to the article under test, at 304. To illustrate, in one example, the control system 110 is configured to generate the test output signal 152, based on the command signal 108, to cause a force to be applied to the article 104 during the first iteration 180.

The method 300 further includes generating an error signal associated with the particular test step during the first iteration, at 306. For example, in some implementations, the control system 110 is configured to generate the error signal 156 in response to applying force to the article 104 in connection with the first iteration 180 of the test step 166.

The method 300 further includes generating, by a gain calculation device coupled to the control system, a gain adjustment value associated with the particular test step based on the error signal, at 308. To illustrate, in one example, the gain calculation device 148 is configured to generate the first gain adjustment value 193 in connection with the first iteration 180 of the test step 166.

The method 300 further includes providing, by a variable gain feedforward device coupled to the gain calculation device and to the control system, a stabilization gain to the control system during a second iteration of the fatigue test and based on the gain adjustment value, at 310. For example, in some implementations, the variable gain feedforward device 150 is configured to provide the first gain adjustment value 193 to the control system 110 during the second iteration 182 of the test step 166.

The method 300 of FIG. 3 illustrates that gain calculation can be performed to determine a gain adjustment value (e.g., the gain adjustment value 193) during a particular iteration of a fatigue test. By applying the gain adjustment value 193 (or another gain adjustment value) to the control system 110 during a subsequent iteration of the fatigue test, overshoot or undershoot conditions can be reduced or avoided, reducing duration of the fatigue test.

Figure 4:
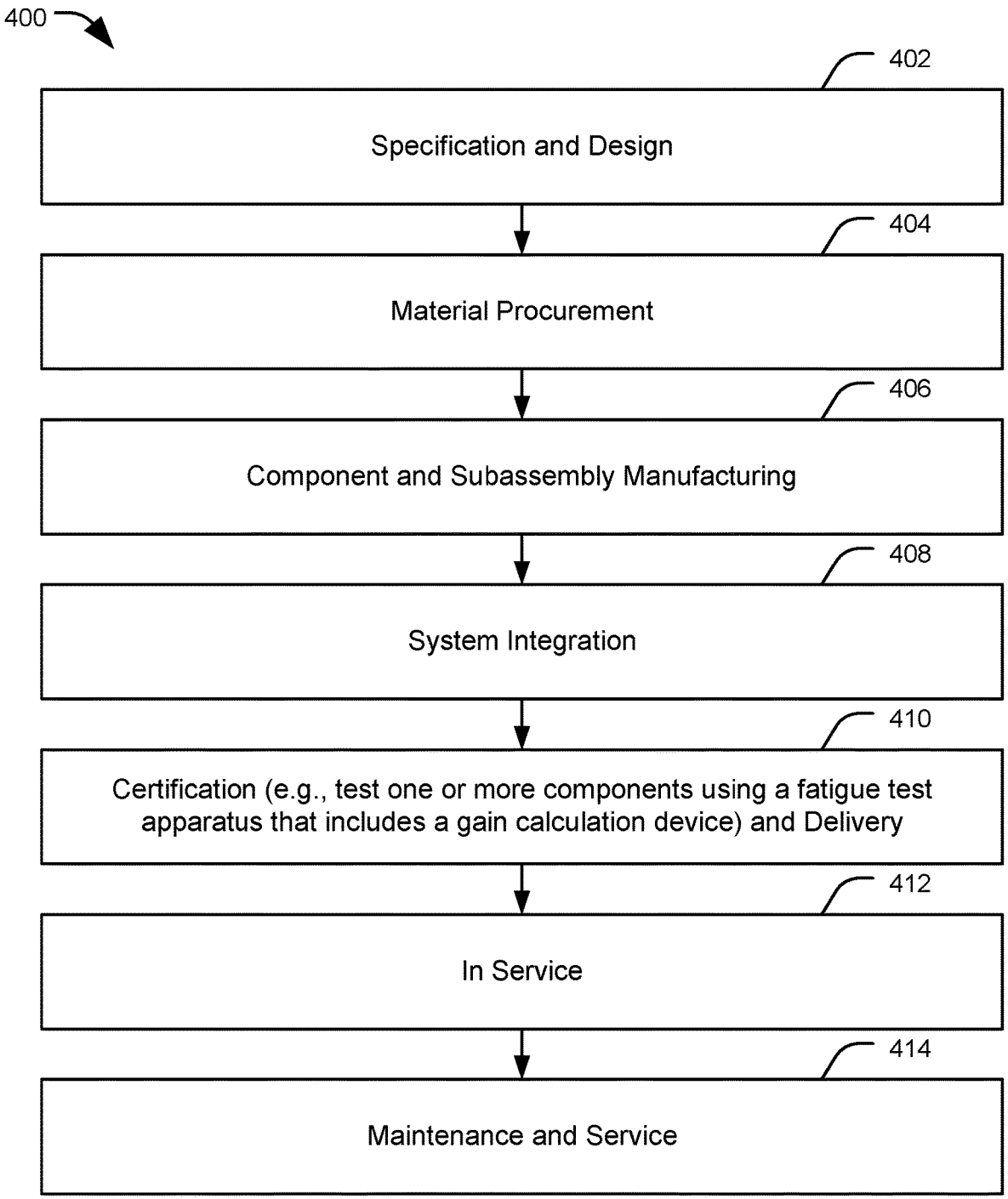
FIG. 4 is a flow chart of an example of a life cycle of a vehicle that includes the article of FIG. 1A.

Referring to FIG. 4, a flowchart of an illustrative example of a life cycle of a vehicle (e.g., an aircraft) is depicted and generally designated 400. Although operations of the method 400 of FIG. 4 are described with reference to a vehicle, it will be appreciated that aspects of the disclosure are also applicable to other components or structures, such as components or materials of a building, as an illustrative example.

During pre-production, the method 400 includes specification and design of the vehicle, at 402. During the specification and design of the vehicle, the method 400 includes specifying components of the vehicle, such as the article 104.

At 404, the method 400 includes material procurement. For example, the method 400 can include procuring materials for the vehicle, such as by procuring materials for the article 104.

During production, the method 400 includes component and subassembly manufacturing, at 406, and system integration of the vehicle, at 408. In some examples, the article 104 is manufactured or assembled (at 406) and integrated within the vehicle (at 408).

The method 400 includes certification and delivery of the vehicle, at 410, and placing the vehicle in service, at 412. In some implementations, certifying the vehicle includes performing a fatigue test of one or more components of the vehicle, such as by performing a fatigue test of the article 104 using the fatigue test apparatus 102.

While in service, the vehicle may be scheduled for routine maintenance and service (which may also include modification, reconfiguration, refurbishment, and so on). At 414, the method 400 includes performing maintenance and service of the vehicle. To illustrate, in some examples, performing maintenance and service includes inspecting and servicing one or more components of the vehicle, such as the article 104.

Figure 5:
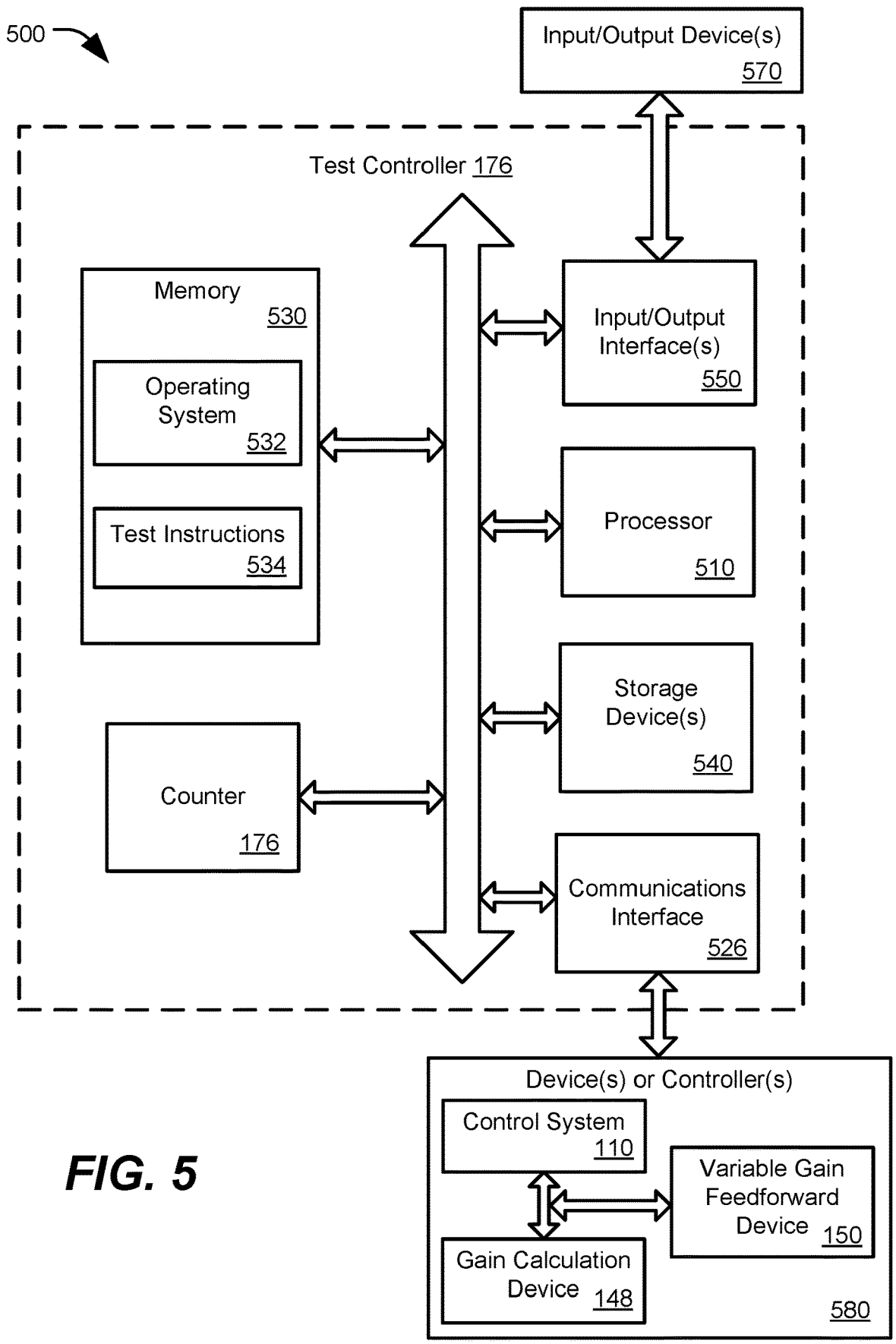
FIG. 5 is a block diagram illustrating aspects of an example of a computing system that is configured to execute instructions to initiate, perform, or control operations, such as operations of method of FIG. 3.

FIG. 5 is an illustration of a block diagram of a computing environment 500 including a computing device, such as the test controller 176. The test controller 176 is configured to support embodiments of computer-implemented methods and computer-executable program instructions (or code) according to the disclosure. In some examples, the test controller 176, or portions thereof, is configured to execute instructions to initiate, perform, or control operations described herein, such as operations of the method 300 of FIG. 3.

The test controller 176 includes a processor 510. The processor 510 is configured to communicate with a memory 530 (e.g., a system memory or another memory), one or more storage devices 540, one or more input/output interfaces 550, a communications interface 526, or a combination thereof.

Depending on the particular implementation, the memory 530 includes volatile memory (e.g., volatile random access memory (RAM) devices), nonvolatile memory (e.g., read-only memory (ROM) devices, programmable read-only memory, or flash memory), one or more other memory devices, or a combination thereof. In FIG. 5, the memory 530 stores an operating system 532, which can include a basic input/output system for booting the test controller 176 as well as a full operating system to enable the test controller 176 to interact with users, other programs, and other devices. In some examples, the memory 530 stores test instructions 534 executable by the processor 510 to initiate, perform, or control one or more operations described herein, such as one or more operations of the method 300 of FIG. 3. In some examples, the test instructions 534 (or other instructions stored at the memory 530) are executable by the processor 510 to transmit data or signals between components of the test controller 176, such as the memory 530, the one or more storage devices 540, the one or more input/output interfaces 550, the communications interface 526, or a combination thereof.

In some implementations, the one or more storage devices 540 include nonvolatile storage devices, such as magnetic disks, optical disks, or flash memory devices. In some examples, the one or more storage devices 540 include removable memory devices, non-removable memory devices, or both. In some implementations, the one or more storage devices 540 are configured to store an operating system, images of operating systems, applications, and program data. In a particular example, the memory 530, the one or more storage devices 540, or both, include tangible computer-readable media.

In the example of FIG. 5, the processor 510 is configured to communicate with the one or more input/output interfaces 550 to enable the test controller 176 to communicate with one or more input/output devices 570 to facilitate user interaction. In some implementations, the one or more input/output interfaces 550 include one or more serial interfaces (e.g., universal serial bus (USB) interfaces or Institute of Electrical and Electronics Engineers (IEEE) 1394 interfaces), parallel interfaces, display adapters, audio adapters, one or more other interfaces, or a combination thereof (IEEE is a registered trademark of The Institute of Electrical and Electronics Engineers, Inc. of Piscataway, New Jersey). In some examples, the one or more input/output devices 570 include keyboards, pointing devices, displays, speakers, microphones, touch screens, one or more other devices, or a combination thereof. In some examples, the processor 510 is configured to detect interaction events based on user input received via the one or more input/output interfaces 550. Alternatively or in addition, in some implementations, the processor 510 is configured to send information to a display via the one or more input/output interfaces 550.

In a particular example, the processor 510 is configured to communicate with (e.g., send signals to) one or more devices 580 using the communications interface 526. In some implementations, the communications interface 526 includes one or more wired interfaces (e.g., Ethernet interfaces), one or more wireless interfaces that comply with an IEEE 802.11 communication protocol, one or more other wireless interfaces, one or more optical interfaces, or one or more other network interfaces, or a combination thereof. In some examples, the one or more devices 580 include host computers, servers, workstations, one or more other computing devices, or a combination thereof. In the example of FIG. 5, the one or more devices 580 include the control system 110, the gain calculation device 148, and the variable gain feedforward device 150.

Although certain aspects of FIG. 5 are described with reference to the test controller 176, it will be appreciated that one or more other devices described herein can include one or more features described with reference to the test controller 176. For example, one or more of the control system 110, the gain calculation device 148, and the variable gain feedforward device 150 can include a memory that stores instructions and a processor that executes the instructions to initiate, perform, or control one or more operations described herein.

Figure 6:
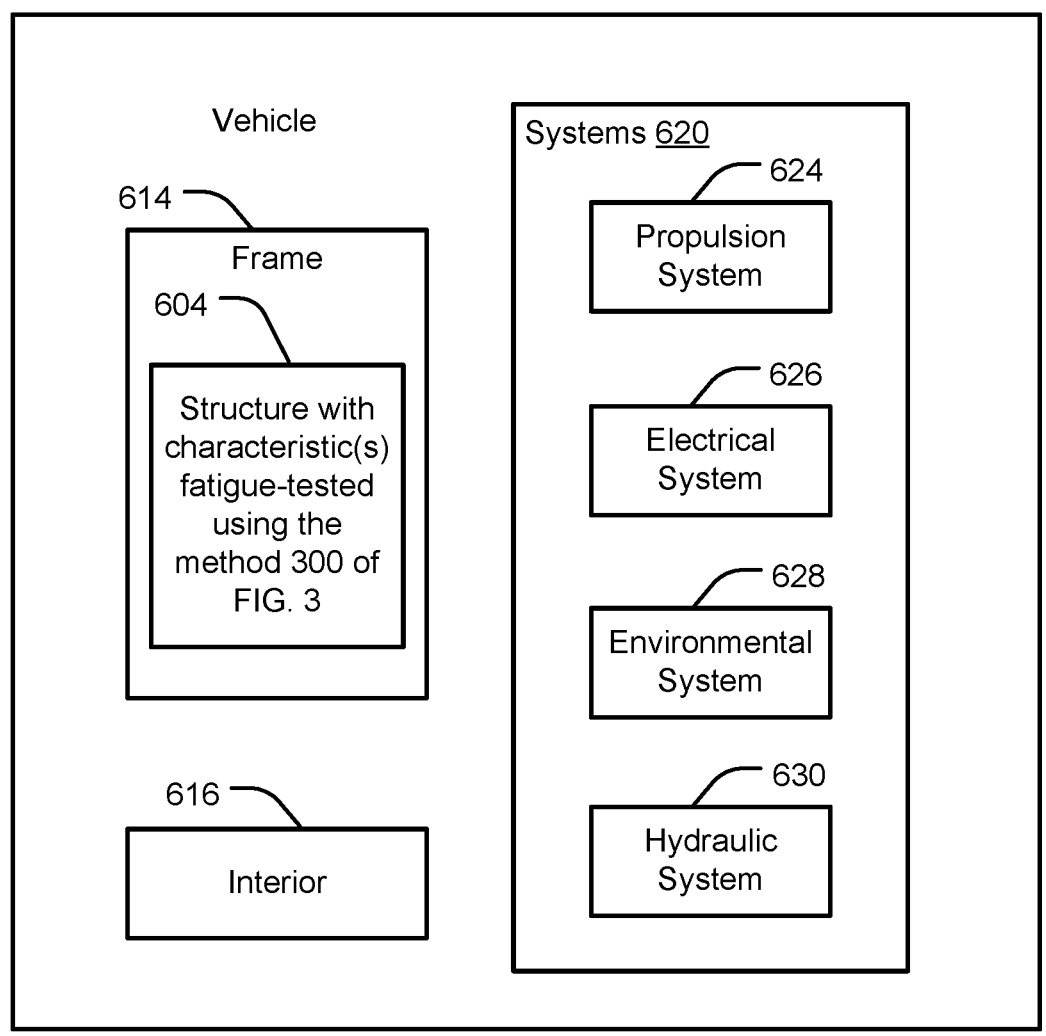
FIG. 6 is a block diagram illustrating aspects of an illustrative implementation of a vehicle that includes the article of FIG. 1A.

To further illustrate, in some implementations, aspects of the disclosure are implemented in a vehicle, such as a vehicle 600 as shown in the example of FIG. 6. In some examples, the vehicle 600 corresponds to an aircraft, a spacecraft, or a ground vehicle, as illustrative examples. Although aspects of FIG. 6 are described with reference to the vehicle 600, it will be appreciated that aspects of the disclosure are also applicable to other components or structures, such as components or materials of a building, as an illustrative example.

As shown in FIG. 6, the vehicle 600 includes a frame 614 (e.g., an airframe of an aircraft) with an interior 616 and a plurality of systems 620. Examples of the plurality of systems 620 include one or more of a propulsion system 624, an electrical system 626, an environmental system 628, and a hydraulic system 630.

In FIG. 6, the frame 614 includes a structure 604 with one or more characteristics fatigue-tested using the method 300 of FIG. 3. As a particular illustrative example, in some implementations, the article 104 has a particular shape or material that is fatigue-tested using the method 300 of FIG. 3, and the structure 604 corresponds to a wing or another structural component of the vehicle 600 having the particular shape or material. Alternatively or in addition, one or more other components of the vehicle 600 can be fatigue tested using one or more operations described herein, such as the method 300 of FIG. 3.

The illustrations of the examples described herein are intended to provide a general understanding of the structure of the various implementations. The illustrations are not intended to serve as a complete description of all of the elements and features of apparatuses and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate, but do not limit, the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A fatigue test apparatus to repeatedly apply force to an article under test, the fatigue test apparatus comprising:
   a control system configured to:
      receive, during a first iteration of a fatigue test of an article under test, a command signal corresponding to a particular test step of the fatigue test;
      generate, based on the command signal and during the first iteration, a test output signal to cause a force to be applied to the article under test; and
      generate an error signal associated with the particular test step during the first iteration;
   a gain calculation device coupled to the control system, wherein the control system is configured to provide the error signal to the gain calculation device, wherein the gain calculation device is configured to generate, based on the error signal, a gain adjustment value associated with the particular test step; and
   a variable gain feedforward device coupled to the gain calculation device and to the control system, wherein the variable gain feedforward device is configured to provide, during a second iteration of the fatigue test and based on the gain adjustment value, a stabilization gain to the control system.

2. The fatigue test apparatus of claim 1, wherein the gain calculation device is further configured to determine, during the first iteration, a first value corresponding to the gain adjustment value.

3. The fatigue test apparatus of claim 2, wherein the gain calculation device is further configured to determine a second value during the second iteration and based on application of the stabilization gain to the control system during the second iteration, and wherein the gain calculation device is further configured to sum the first value and the second value to generate a second gain adjustment value during the second iteration.

4. The fatigue test apparatus of claim 3, wherein the variable gain feedforward device is further configured to adjust the stabilization gain, during a third iteration of the particular test step, based on the second gain adjustment value.

5. The fatigue test apparatus of claim 1, further comprising an actuator, wherein the test output signal is configured to cause the actuator to apply the force to the article under test to achieve a target deformation of the article under test, and wherein the error signal indicates a deviation between a measured deformation of the article under test and the target deformation.

6. The fatigue test apparatus of claim 5, wherein the stabilization gain is selected to cause a second deviation between the target deformation and a second measured deformation of the article under test associated with the particular test step during the second iteration to be less than the deviation associated with the particular test step during the first iteration.

7. The fatigue test apparatus of claim 1, wherein the gain calculation device is further configured to receive multiple samples of the error signal and to determine a running sum value associated with the multiple samples.

8. The fatigue test apparatus of claim 7, wherein the gain calculation device is further configured to divide the running sum value by a duration value associated with the error signal to determine a weighted error sum value.

9. The fatigue test apparatus of claim 8, wherein the gain calculation device is further configured to scale the weighted error sum value to determine the gain adjustment value.

10. The fatigue test apparatus of claim 1, wherein the control system comprises a command input node and a gain stage, wherein the command input node is configured to provide the error signal to the gain calculation device and the gain stage, and wherein the gain calculation device and the gain stage are distinct.

11. The fatigue test apparatus of claim 1, wherein the error signal corresponds to an overshoot condition or an undershoot condition detected by the control system.

12. A method comprising:
   receiving, by a control system and during a first iteration of a fatigue test of an article under test, a command signal corresponding to a particular test step of the fatigue test;
   generating, based on the command signal and during the first iteration, a test output signal to cause a force to be applied to the article under test;
   generating an error signal associated with the particular test step during the first iteration;
   generating, by a gain calculation device coupled to the control system, a gain adjustment value associated with the particular test step based on the error signal, wherein the control system is configured to provide the error signal to the gain calculation device; and
   during a second iteration of the fatigue test and based on the gain adjustment value, providing, by a variable gain feedforward device coupled to the gain calculation device and to the control system, a stabilization gain to the control system.

13. The method of claim 12, wherein the test output signal causes an actuator to apply the force to the article under test to achieve a target deformation of the article under test, and wherein the error signal indicates a deviation between a measured deformation of the article under test and the target deformation.

14. The method of claim 13, wherein the stabilization gain is selected to cause a second deviation between the target deformation and a second measured deformation of the article under test associated with the particular test step during the second iteration to be less than the deviation associated with the particular test step during the first iteration.

15. The method of claim 12, further comprising:
   receiving multiple samples of the error signal at the gain calculation device; and determining a running sum value associated with the multiple samples.

16. The method of claim 15, further comprising dividing the running sum value by a duration value associated with the error signal to determine a weighted error sum value.

17. The method of claim 16, further comprising scaling the weighted error sum value to determine the gain adjustment value.

18. A computer-readable medium storing instructions executable by a processor to initiate, control, or perform operations, the operations comprising:
  receiving, by a control system and during a first iteration of a fatigue test of an article under test, a command signal corresponding to a particular test step of the fatigue test;
  generating, based on the command signal and during the first iteration, a test output signal to cause a force to be applied to the article under test;
  generating an error signal associated with the particular test step during the first iteration;
  generating, by a gain calculation device coupled to the control system, a gain adjustment value associated with the particular test step based on the error signal, wherein the control system is configured to provide the error signal to the gain calculation device; and
  during a second iteration of the fatigue test and based on the gain adjustment value, providing, by a variable gain feedforward device coupled to the gain calculation device and to the control system, a stabilization gain to the control system.

19. The computer-readable medium of claim 18, wherein the test output signal is configured to cause an actuator to apply the force to the article under test to achieve a target deformation of the article under test, and wherein the error signal indicates a deviation between a measured deformation of the article under test and the target deformation.

20. The computer-readable medium of claim 19, wherein the stabilization gain is selected to cause a second deviation between the target deformation and a second measured deformation of the article under test associated with the particular test step during the second iteration to be less than the deviation associated with the particular test step during the first iteration.

* * * * *